(12) United States Patent
Ichida et al.

(10) Patent No.: US 7,509,888 B2
(45) Date of Patent: Mar. 31, 2009

(54) HYDRAULIC GEAR SHIFT MECHANISM

(75) Inventors: Tadashi Ichida, Nara (JP); Akira Tsumiyama, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 84 days.

(21) Appl. No.: 11/534,378

(22) Filed: Sep. 22, 2006

(65) Prior Publication Data

US 2007/0163378 A1   Jul. 19, 2007

Related U.S. Application Data

(60) Continuation of application No. 11/079,799, filed on Mar. 11, 2005, now Pat. No. 7,137,314, which is a division of application No. 09/876,346, filed on Jun. 7, 2001, now Pat. No. 7,032,475.

(51) Int. Cl.
   *B60K 20/06* (2006.01)
   *G05G 1/08* (2006.01)

(52) U.S. Cl. .................. 74/502.2; 74/504; 74/484; 74/473.11; 74/3

(58) Field of Classification Search ........... 74/502.2, 74/503–504, 473.1, 473.11, 473, 484–489; 188/351, 344; 180/220–226; 474/80–82, 474/70
See application file for complete search history.

(56) References Cited

U.S. PATENT DOCUMENTS

| | | | |
|---|---|---|---|
| 3,742,777 A | | 7/1973 | Mathauser .................. 74/242.3 |
| 3,776,333 A | * | 12/1973 | Mathauser .................. 188/344 |
| 3,935,930 A | * | 2/1976 | Kine .......................... 188/344 |
| 3,991,845 A | * | 11/1976 | LaPointe .................... 180/336 |
| 4,497,503 A | * | 2/1985 | Irwin ......................... 180/335 |
| 4,560,049 A | * | 12/1985 | Uchibaba et al. .......... 192/85 R |
| 4,633,726 A | * | 1/1987 | Chang ..................... 74/473.11 |
| 4,635,442 A | * | 1/1987 | Bass ........................... 60/594 |
| 4,896,753 A | * | 1/1990 | Sule ........................... 188/344 |
| 5,178,033 A | * | 1/1993 | Kund ......................... 74/502.2 |
| 5,325,735 A | * | 7/1994 | Nagano ..................... 74/502.2 |
| 5,368,136 A | | 11/1994 | Walte |
| 5,443,134 A | * | 8/1995 | Gajek et al. ................ 74/502.2 |
| 5,601,001 A | * | 2/1997 | Kawakami et al. ......... 74/502.2 |
| 5,655,982 A | * | 8/1997 | Fyfe ........................... 474/80 |
| 5,678,665 A | * | 10/1997 | Debreczeni ................ 74/502.4 |
| 5,832,782 A | * | 11/1998 | Kawakami ............... 74/473.13 |

(Continued)

FOREIGN PATENT DOCUMENTS

DE   19514267 A1   10/1996

(Continued)

*Primary Examiner*—Marcus Charles
(74) *Attorney, Agent, or Firm*—Jeffer Mangels Butler & Marmaro LLP

(57) ABSTRACT

A hydraulic gear shift mechanism for a bicycle having a positioning mechanism for controlling the motion of the piston of a master cylinder assembly is disclosed, wherein the master cylinder assembly is in communication with a slave cylinder for operation of a derailleur. The positioning mechanism preferably includes a pivot shaft spaced apart from the handlebar, a rotating member rotatable about the pivot shaft, a push mechanism for rotating the rotating member in a first direction and a return mechanism for rotating the rotating member in a second direction. In a more preferred embodiment of the invention, an adjuster piston is threadingly engaged with the master cylinder assembly for adjusting the initial position of the slave cylinder.

13 Claims, 9 Drawing Sheets

U.S. PATENT DOCUMENTS

| | | | |
|---|---|---|---|
| 5,862,709 A * | 1/1999 | Kageyama | 74/489 |
| 5,890,979 A | 4/1999 | Wendler | 474/82 |
| 5,941,125 A * | 8/1999 | Watarai et al. | 74/502.2 |
| 5,967,937 A | 10/1999 | Matsuo | |
| 6,003,639 A * | 12/1999 | Buckley et al. | 188/26 |
| 6,095,309 A * | 8/2000 | Mione | 74/502 |
| 6,159,119 A * | 12/2000 | Nakamura et al. | 474/80 |
| 6,276,231 B1 * | 8/2001 | Yamane | 74/551.9 |
| 7,032,475 B2 * | 4/2006 | Ichida et al. | 74/502.2 |
| 7,137,314 B2 * | 11/2006 | Ichida et al. | 74/502.2 |

FOREIGN PATENT DOCUMENTS

| | | |
|---|---|---|
| FR | 1044279 | 11/1953 |
| JP | 9039868 A | 2/1997 |

* cited by examiner

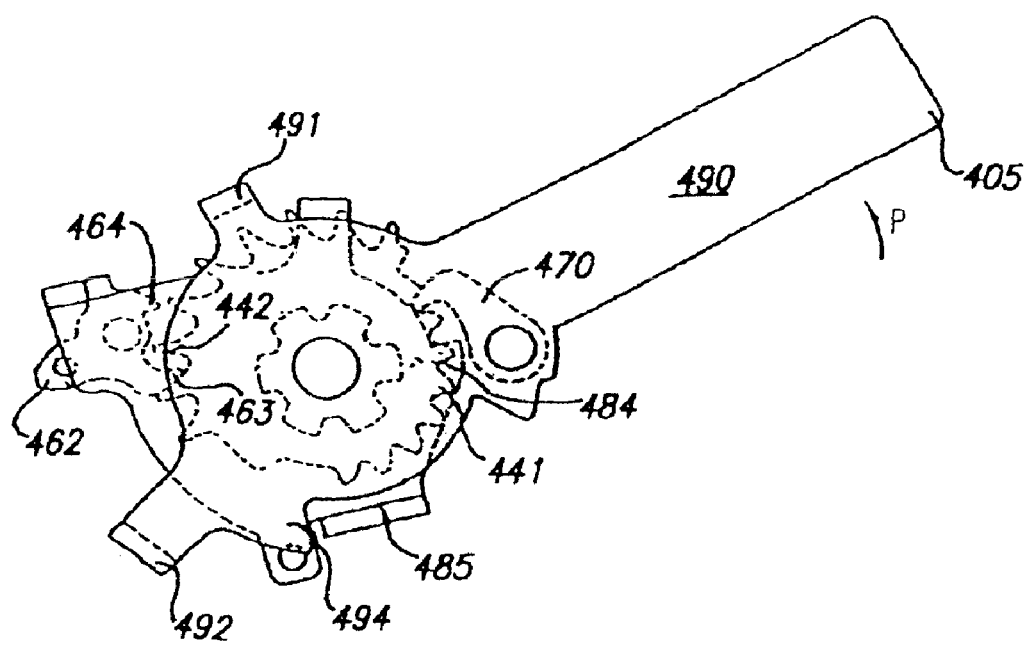
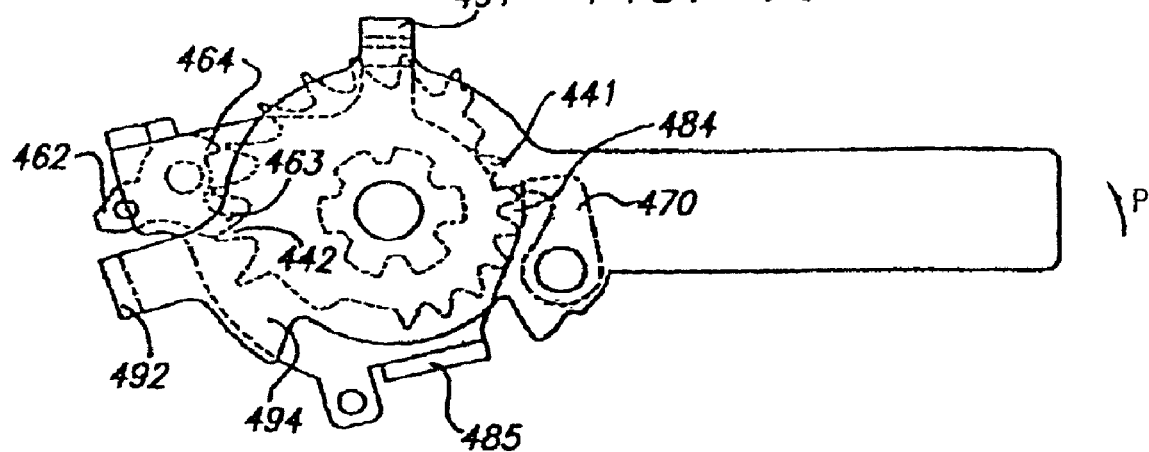

HYDRAULIC GEAR SHIFT MECHANISM

RELATED APPLICATIONS

This application is a continuation of U.S. patent application Ser. No. 11/079,799, filed on Mar. 11, 2005 now U.S. Pat. No. 7,137,314, which is a division of U.S. patent application Ser. No. 09/876,346, filed on Jun. 7, 2001, now U.S. Pat. No. 7,032,475, each of which are incorporated herein in their entireties by this reference.

FIELD OF THE INVENTION

The present invention relates generally to a shift control device for a bicycle, and more particularly, to a hydraulically operated bicycle gear shift mechanism utilized in conjunction with multiple sprockets and derailleurs.

BACKGROUND OF THE INVENTION

In typical bicycle gear shift devices, a shift control cable transmits the force of an actuating member operable by a bicyclist, to a derailleur arranged adjacent to the sprockets. To protect the cable from damage caused by environmental conditions, such as dirt or moisture, a sleeve is generally provided on the shift control cable. However, even when utilizing a sleeve, portions of the shift control cable, such as the portion of the cable between the end of the cable sleeve and the derailleur, remain exposed and are thus susceptible to damage. This is particularly disadvantageous for the portions of the shift control cable that are close enough to the road surface such that dirt and mud from the road surface can precipitate on the cable. Continued exposure to the road condition causes dirt to accumulate on the shift control cable, which eventually impedes the motion of the cable in and out of the cable sleeve. As a result, the shifting mechanism may then be movable either by great force only or not at all.

Another disadvantage of the cable operated gear shift systems is that the shift control cable tends to stretch over a period of time and thus the derailleur mechanism needs to be adjusted in order to effect proper shifting of gears. Additionally, the cable frequently becomes rusted or worn and accordingly will break when a gear change is attempted. Installation and maintenance of the control shift cable is complicated and requires the elimination of any kinks and bends in the cable that can result in additional frictional force between the cable and the sleeve.

To overcome the disadvantages of cable operated gear shift systems, hydraulically operated systems have been proposed. However, the problem with the known hydraulic gear shift systems is that the mechanisms used for indexed shifting are less sophisticated and imprecise. Accordingly, it is desirable to provide a hydraulic gear shift mechanism having a control device that provides precise positioning for indexed shifting.

Another disadvantage of known hydraulically operated gear shift systems is that if the system needs an adjustment, an end point adjustment is typically made at the slave cylinder assembly to adjust the initial position of the slave piston. Given that the slave cylinder assembly is located near the derailleur, it is inconvenient to a bicycle rider to make an adjustment at that location. Accordingly, it is desirable to provide an adjuster at a location that is easily accessible to the rider.

SUMMARY OF THE PREFERRED EMBODIMENTS

In a first aspect of the present invention, a hydraulic gear shift mechanism for a bicycle having a handle bar is provided. The gear shift mechanism preferably comprises a lever, a positioning mechanism, a master cylinder assembly, a slave cylinder assembly, a conduit conveying a fluid between the master cylinder assembly and slave cylinder assembly, and a derailleur operatively connected to the slave cylinder assembly and movable in response to the actuation of the master cylinder assembly.

In a preferred embodiment, the positioning mechanism is actuatable by the lever and has a bracket, a pivot shaft spaced apart from the handlebar and fixedly secured to the bracket, a member, a push mechanism, and a return mechanism. The member is preferably rotatable in a first direction and a second direction about the pivot shaft. The push mechanism preferably comprises a first latch segment and a push pawl biased toward the first latch segment and configured to cooperate with the first latch segment to rotate the member in a first direction.

In another preferred embodiment, the master cylinder assembly is operatively connected to the member of the positioning mechanism and also preferably has a piston that is movable in a push direction when the member rotates in a first direction and is movable in a return direction when the member rotates in a second direction.

In accordance with another aspect of the present invention, a hydraulic gear shift mechanism for a bicycle having a handlebar is provided, wherein the gear shift mechanism comprises a lever, a positioning mechanism, a master cylinder assembly, a slave cylinder assembly, a conduit conveying a fluid between the master cylinder assembly and the slave cylinder assembly, and a derailleur operatively connected to the slave cylinder assembly and movable in response to the actuation of the master cylinder assembly. The positioning mechanism is preferably actuatable by the lever. The master cylinder assembly preferably is operatively connected to the positioning mechanism and more preferably has a primary piston and an adjuster piston.

In preferred embodiments, the master cylinder assembly comprises a master chamber and an adjuster chamber, the primary piston is disposed in the master chamber, and the adjuster piston is disposed in the adjuster chamber. In other preferred embodiments, the adjuster piston has a depth in the adjuster chamber, the slave cylinder assembly includes a slave piston having an initial position, and the depth of the adjuster piston in the adjuster chamber may be varied to adjust the initial position of the slave piston. In yet other preferred embodiments, the lever is operable in a first direction and a second direction and is biased in a neutral position between the first and second directions.

In further preferred embodiments, the positioning mechanism comprises a bracket, a pivot shaft spaced apart from the handlebar and fixedly secured to the bracket, and a member, rotatable in a first direction and a second direction about the pivot shaft such that the rotation of the member in the first direction moves the primary piston in a push direction and the rotation of the member in the second direction moves the primary piston in a return direction.

In still other preferred embodiments, the positioning mechanism further comprises a push mechanism operatively connected to the member and a return mechanism operatively connected to the member, such that the operation of the push mechanism rotates the member in the first direction, and the operation of the return mechanism rotates the member in the second direction. In yet further preferred embodiments, the conduit has a conduit volume and the adjuster piston is rotatably movable to adjust the conduit volume.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIGS. 6a-6e are top cross-sectional views of the positioning mechanism of the present invention in operation in an upshift direction.

Like numerals refer to like parts throughout the several views of the drawings.

DETAILED DESCRIPTION OF THE PREFERRED EMBODIMENTS

Figure 1:
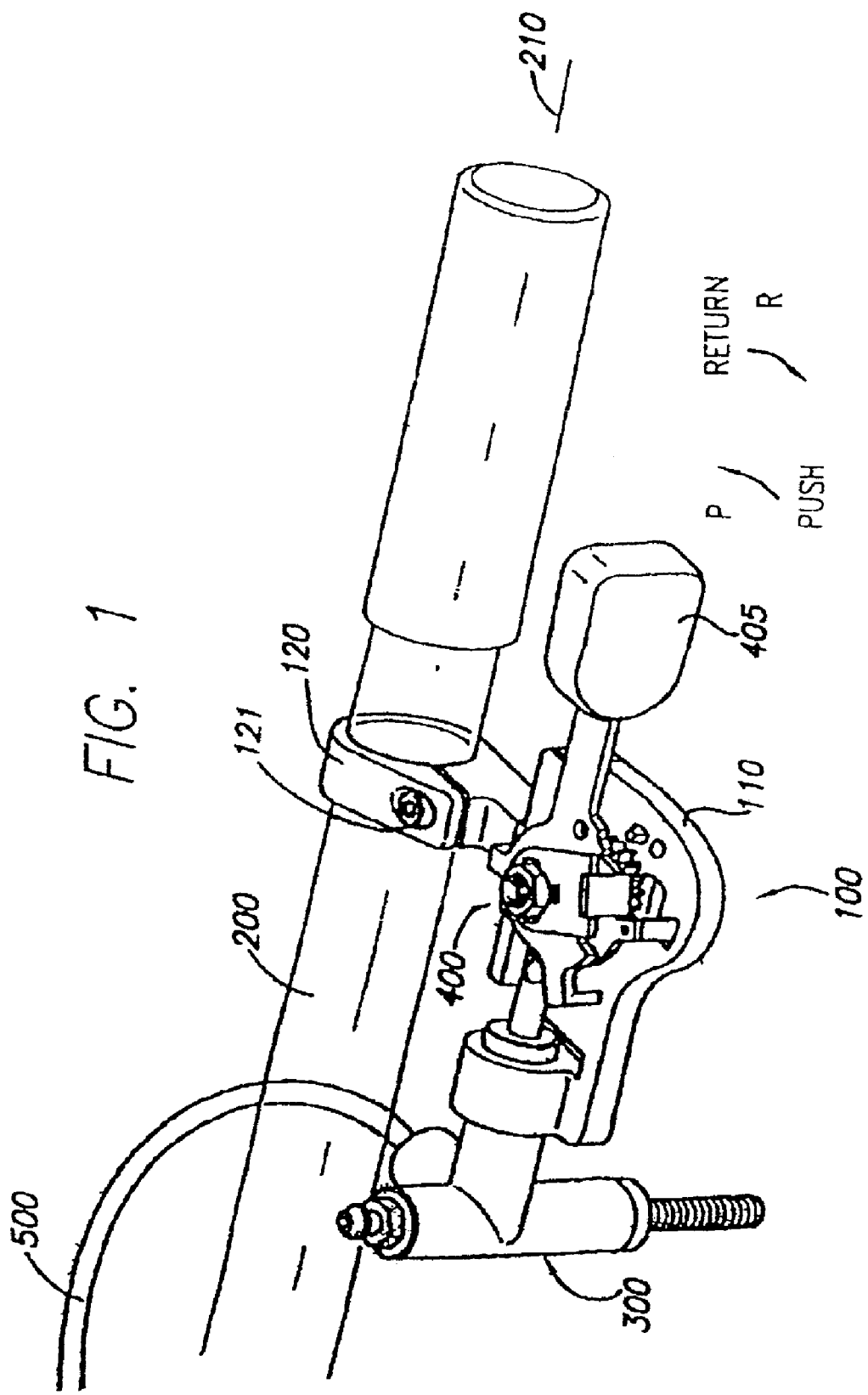
FIG. 1 is a perspective front view of a preferred embodiment of the shift control device of the present invention as attached to a bicycle handlebar.

FIG. 1 depicts a preferred embodiment of the shift control device 100 of the present invention as attached to a bicycle handlebar 200. In a preferred embodiment of the invention, the shift control device 100 includes a bracket or base member 110, a master cylinder assembly 300 and a positioning mechanism 400. The handlebar 200 is preferably a flat-bar type handlebar having a cylindrical body that extends substantially along a handlebar axis 210. The bracket 110 is secured to the handlebar 200 of the bicycle preferably by a clamp band 120 and a bolt and nut assembly 121. A fluid conduit 500 connects the master cylinder assembly 300 to the slave cylinder assembly, as will be discussed in further detail below.

The positioning mechanism 400 preferably includes a lever 405 that, as described in further detail below, controls the operation of the positioning mechanism 400. In a preferred embodiment of the invention, the lever 405 is configured such that operation of the lever 405 in a first direction, P, operates the positioning mechanism in a push direction, and in a second direction, R, operates the positioning mechanism in a return direction. In a more preferred embodiment of the invention, as shown in FIG. 1, the first direction, P, is the direction of movement of the lever 405 from a neutral position toward the handlebar 200 of the bicycle and the second direction, R, is the direction of movement of the lever 405 from a neutral position away from the handlebar 200.

Figure 2:
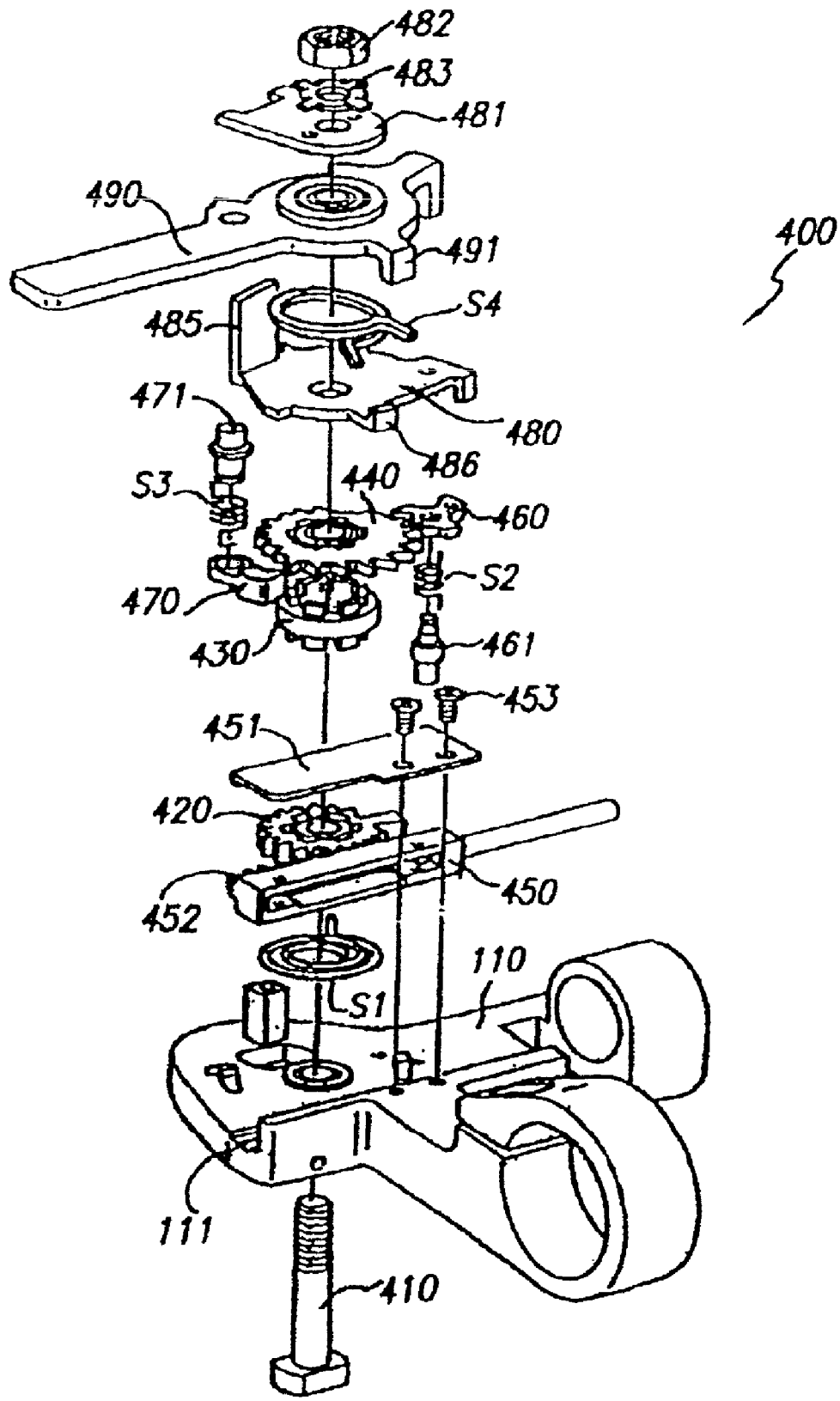
FIG. 2 is an exploded perspective view of a preferred embodiment of the positioning mechanism of the present invention.
Figure 3:
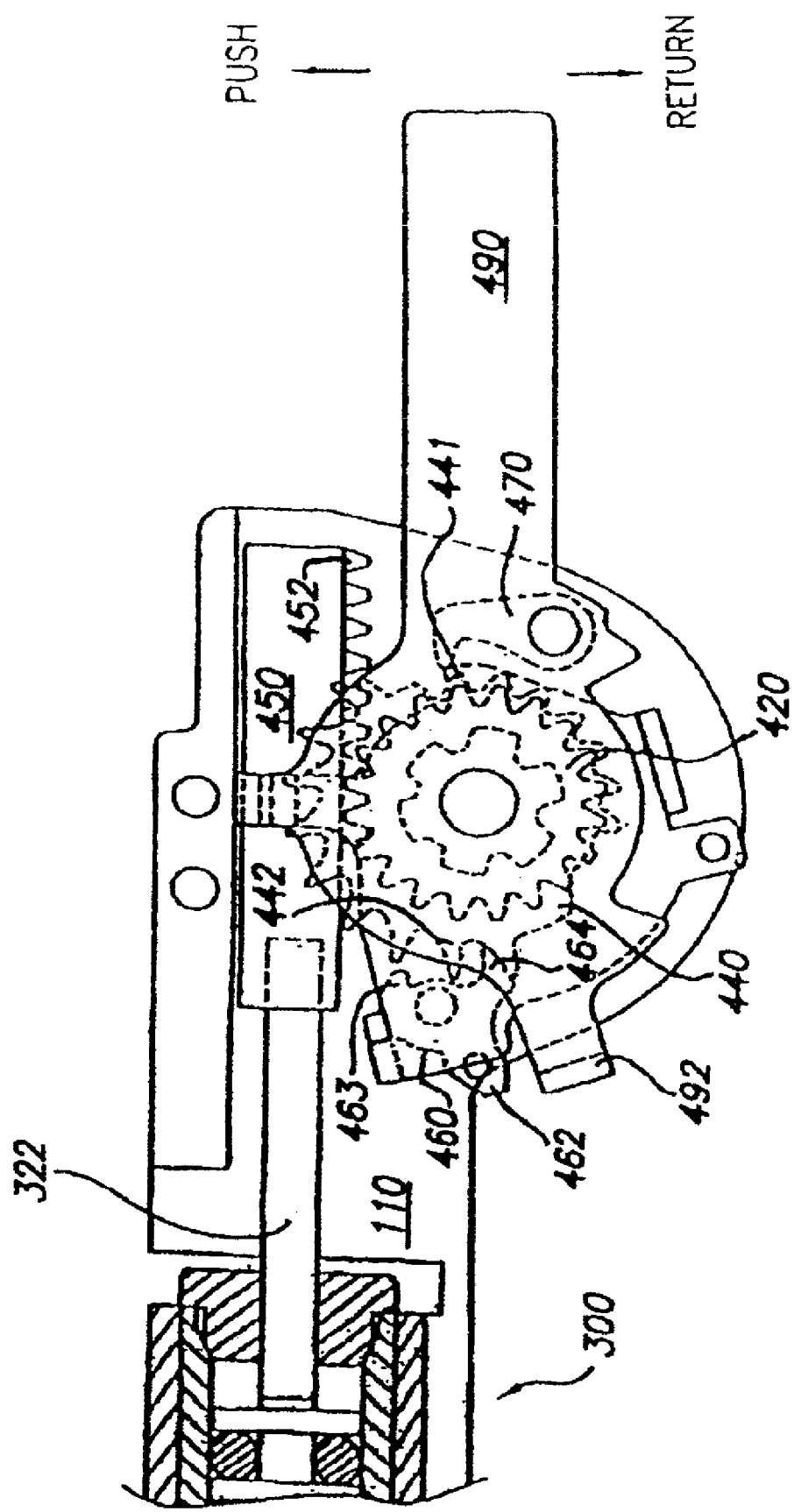
FIG. 3 is a top cross-sectional view of the positioning mechanism of the present invention in a neutral position.

FIGS. 2 and 3 depict a preferred embodiment of the positioning mechanism 400 of the present invention. In a preferred embodiment, the positioning mechanism 400 includes a pivot shaft 410 fixedly attached to the bracket 110 and extending upwardly therefrom. The pivot shaft 410 is preferably press fitted perpendicularly into the bottom plane of the bracket 110, however, other known techniques for connecting the pivot shaft to the bracket can also be used. A pinion gear 420, spacer 430 and latch plate 440 are rotatably supported on the pivot shaft 410 and fixed to each other. The pinion gear 420, spacer 430 and latch plate 440 are preferably biased in a clockwise direction by spring S1.

A rack gear 450 is preferably slidably supported in a rail 111 of the bracket 110. Lid plate 451 is positioned above the rack gear 450 and secured to the bracket 110 to slidably hold the rack gear 450 in place. The lid plate 451 is preferably secured to the bracket 110 with screws 453, however, other known fasteners can also be used. The rack gear 450 includes a plurality of gear teeth 452 which are dimensioned to engage the pinion gear 420. Through the engagement of the pinion gear with the gear teeth 452 of the rack gear 450, the rotation of the pinion gear 420 is translated to an axial movement of the rack gear 450. As best shown in FIG. 3, the rack gear 450 is connected to the piston rod 322 of the master cylinder assembly 300. The axial movement of the rack gear 450 results in a corresponding movement of the piston rod 322 of the master cylinder assembly 300.

Referring to FIGS. 2 and 3, the positioning mechanism 400 preferably includes a fixed plate 480 and an operating plate 490. In a preferred embodiment of the invention, the fixed plate 480 is fixed to the bracket 110 and an upper support 481 is fixedly coupled to the fixed plate 480. The operating plate 490 is rotatably supported on the main pivot shaft 410 and biased in a neutral position by spring S4. The lever 405 is preferably integral with the operating plate 490 such that the lever 405 and operating plate 490 rotate together about the pivot shaft 410 when the lever 405 is operated.

To control the rotation of the latch plate 440, the positioning mechanism 400 includes a return pawl 460 and a push pawl 470 configured to engage latch plate 440. The return pawl 460 is rotatably supported on pivot shaft 461 and includes an abutment 462, a first claw 463 and a second claw 464. The pivot shaft 461 is fixedly attached to the bracket 110. The return pawl 460 is preferably biased in a counterclockwise direction by spring S2. The push pawl 470 is rotatably supported on pivot shaft 471 and biased toward in the counterclockwise direction by spring S3. Pivot shaft 471 is preferably fixed to the operating plat 490. A nut 482 and washer 483 are threaded onto the pivot shaft 410 to secure the components of the positioning mechanism 400 on the pivot shaft 410.

Figure 4:
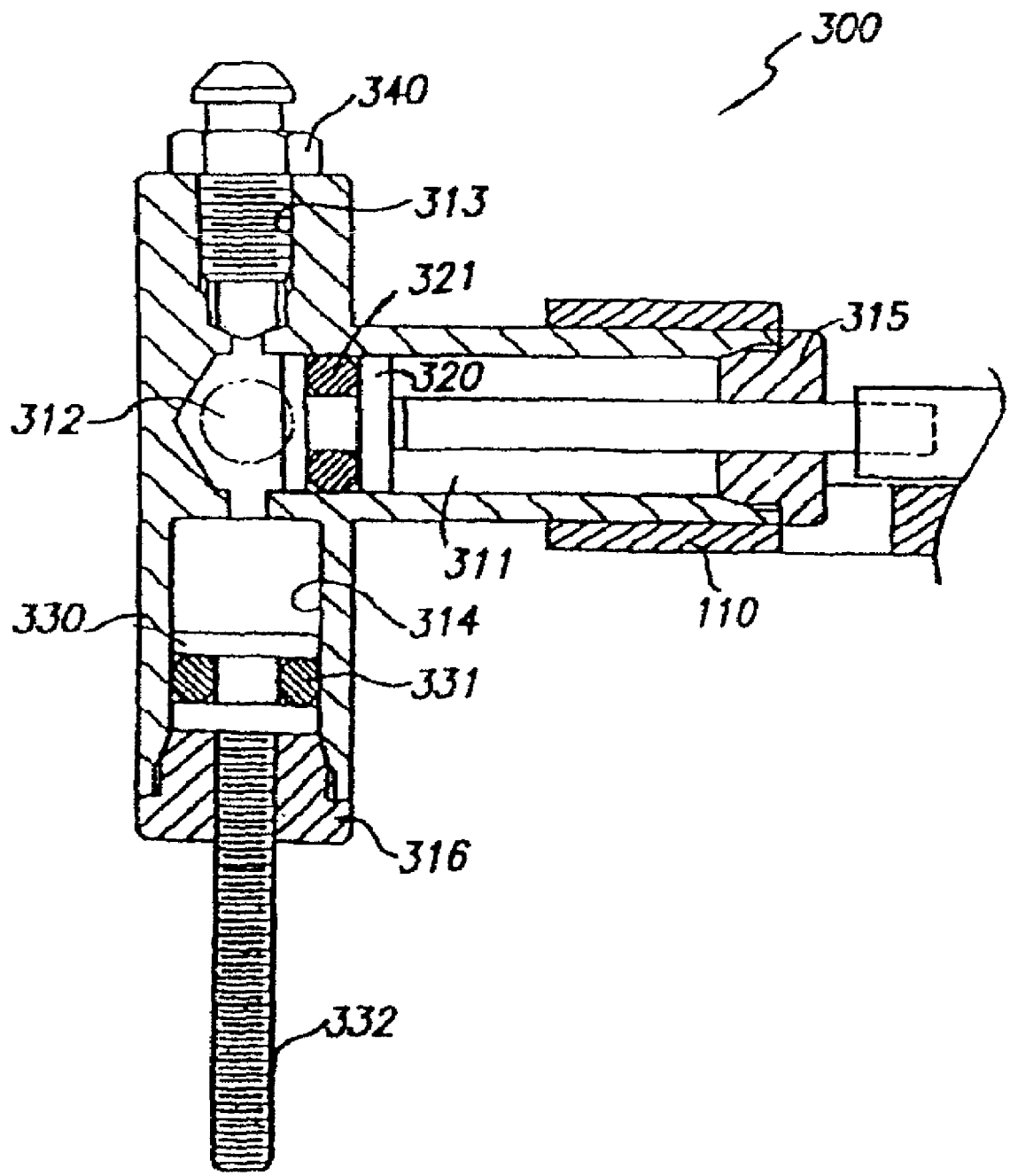
FIG. 4 is a side cross-sectional view of a preferred embodiment of the master cylinder assembly of the present invention.

FIG. 4 depicts a preferred embodiment of the master cylinder assembly 300 of the present invention. The master cylinder assembly 300 is preferably rigidly coupled to bracket 110. In a preferred embodiment, the master cylinder assembly 300 includes a main chamber 311, a bleed port 313, an adjusting chamber 314 and a connecting port 312. A master piston 320 is disposed in the main chamber 311 and is sealed with a rubber ring 321. A main chamber plug 315 is threaded into the main chamber 311 for sealing the main chamber 311 and slidably supporting piston rod 322. Piston rod 322 is preferably separable from the piston 320. A bleed nipple 340 preferably plugs the bleed port 313.

An adjusting piston 330 is disposed in the adjusting chamber 314 and is sealed with a rubber ring 331. An adjusting chamber plug 316 is threaded into the adjusting chamber 314 for sealing the adjusting chamber 314 and supporting the adjusting piston rod 332. The adjusting piston rod 332 is preferably externally threaded, having threads that correspond to and engage with internal threads of the adjusting chamber plug 316. The adjusting piston rod 332 is preferably connected to the adjusting piston 330 such that the threading of the piston rod 332 into or out of the adjusting chamber plug 316 changes the location of the adjusting piston 330 in the adjusting chamber 314.

The master cylinder assembly 300 and slave cylinder assembly 700 are in fluid communication via the fluid conduit 500. The fluid conduit 500 is preferably connected to the master cylinder 300 at the connecting port 312. Because the master cylinder assembly 300 and slave cylinder assembly 700 are in fluid communication, the initial position of the slave piston may be adjusted by changing the position of the adjusting piston 330 in the adjusting chamber 314. For example, if the adjusting piston 330 is threaded further into the adjusting chamber 314, the fluid is moved through the conduit 500 toward the slave cylinder assembly 700 causing the slave piston to be pushed back. One of the advantages of the present invention is that the end point adjustment of the slave piston can be made conveniently at the handlebar.

Figure 5:
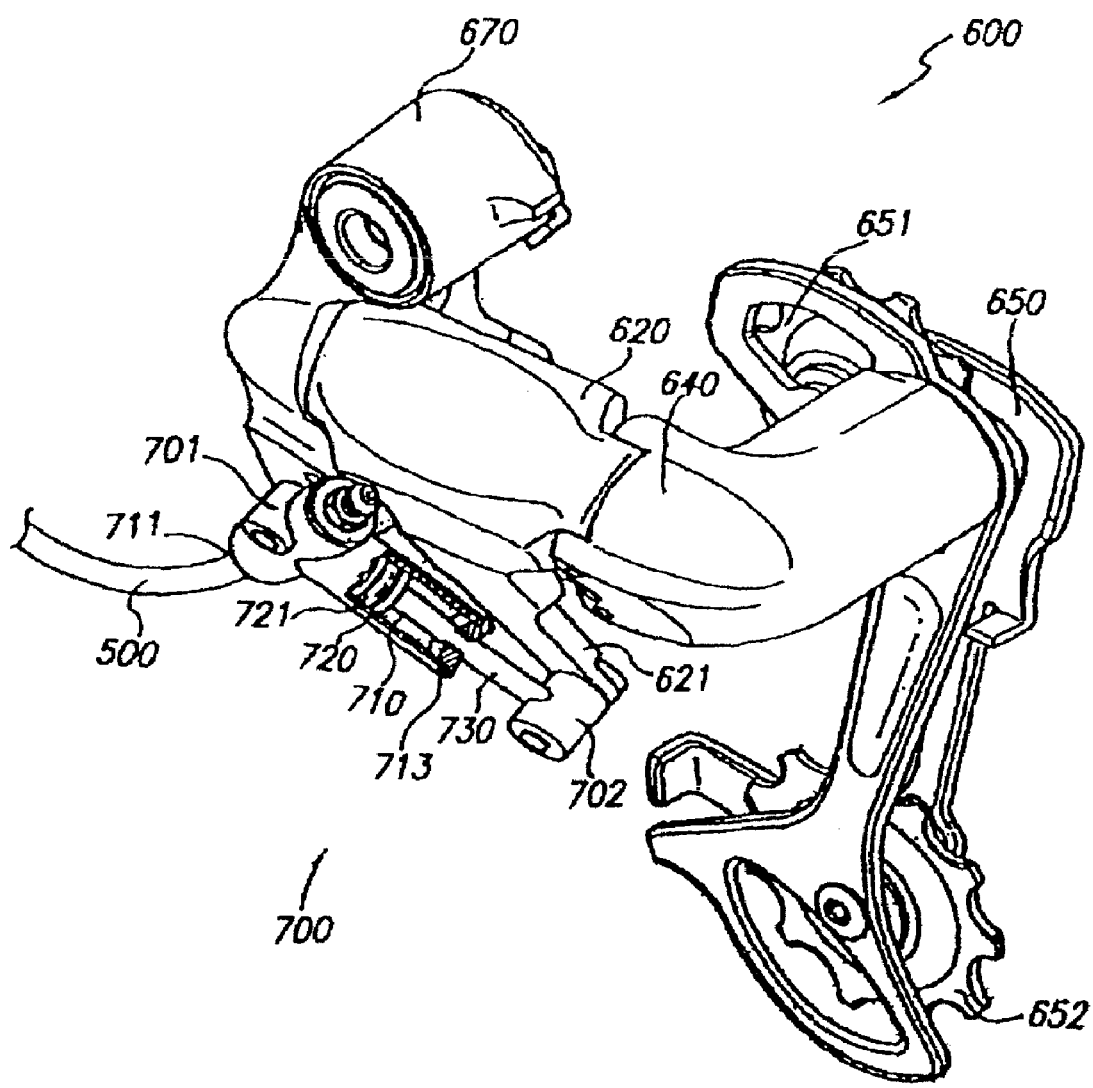
FIG. 5 is a perspective view of a preferred embodiment of the slave cylinder assembly of the present invention as attached to a derailleur.

As shown in FIG. 5, in a preferred embodiment of the invention, the gear shift mechanism includes a four-bar linkage type derailleur 600 having a base member 610, a shifting member 640, an outer link 620 and an inner link 630. The base member is fixedly mountable on the bicycle frame and the shifting member 640 is connected to the base member 610 via the outer link 620 and inner link 630. The shifting member 640 is preferably biased toward the center line of the bicycle by a spring disposed inside of the four-bar linkage (not shown). A pulley cage 650, pivotably connected to the shifting member 640, rotatably supports a guide pulley 651 and a tension pulley 652.

A slave cylinder assembly 700 is operatively connected to the derailleur 600. In a preferred embodiment of the invention, the first end 701 of the slave cylinder assembly 700 is pivotably supported on the base member 610 and the second end 702 of the slave cylinder assembly 700 is pivotably supported on the arm 621 formed on the outer link 620. The slave cylinder assembly 700 preferably includes a slave cylinder chamber 710. The fluid conduit 500 is preferably connected to the slave cylinder assembly 700 at the connecting port 711. A slave piston 720 is disposed in the slave cylinder chamber 710 and is sealed with a rubber ring 721. A slave cylinder plug 713 sealingly engages the slave cylinder chamber 710 and slidingly supports the slave piston rod 730. Slave piston rod 730 is preferably separable from piston 720 and is not rigidly connected thereto.

FIG. 3 depicts the positioning mechanism 400 of the present invention in a neutral position. In the neutral state, the operating plate 490 remains stationary because the spring S4 squeezes tab 491 formed on the operating plate 490 and tab 486 formed on the fixed plate 480, as best shown in FIG. 2, from both sides. In the neutral position, the push pawl 470 rests on a ramp 484 peripherally formed on the fixed plate 480. The first claw 463 of the return pawl 460 is engaged with positioning latch teeth 442 formed on the latch plate 440. The rack gear 450 is biased in the direction away from the master cylinder assembly 300 (corresponding to the right in FIG. 3) by the biasing force of the return spring of the derailleur transmitted by fluid. The pinion gear 420 is biased in a clockwise direction by spring S1 and by the force transmitted from the rack gear 450. The engagement of the first claw 463 of the return pawl 460 with the positioning latch teeth 442 maintains the position of the pinion gear 420 and prevents the pinion gear 420 from freely rotating in the clockwise direction.

FIGS. 6a through 6e depict the operation of the positioning mechanism 400 in an upshift or push direction. To actuate the positioning mechanism 400 in a push direction, P, the lever 405 is activated in a push direction. As discussed above, in a preferred embodiment of the invention, the push direction P is defined as the direction of movement of the lever 405 from the neutral position toward the handlebar. In FIGS. 6a through 6e, the elements that do not relate to the upshift operation are eliminated for ease of understanding.

Figure 6A:
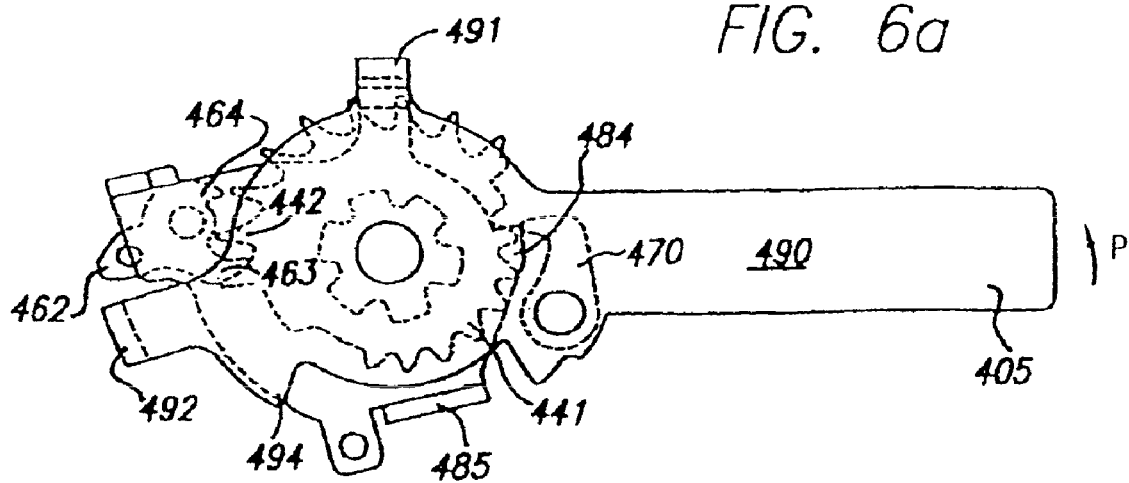
Figure 6B:
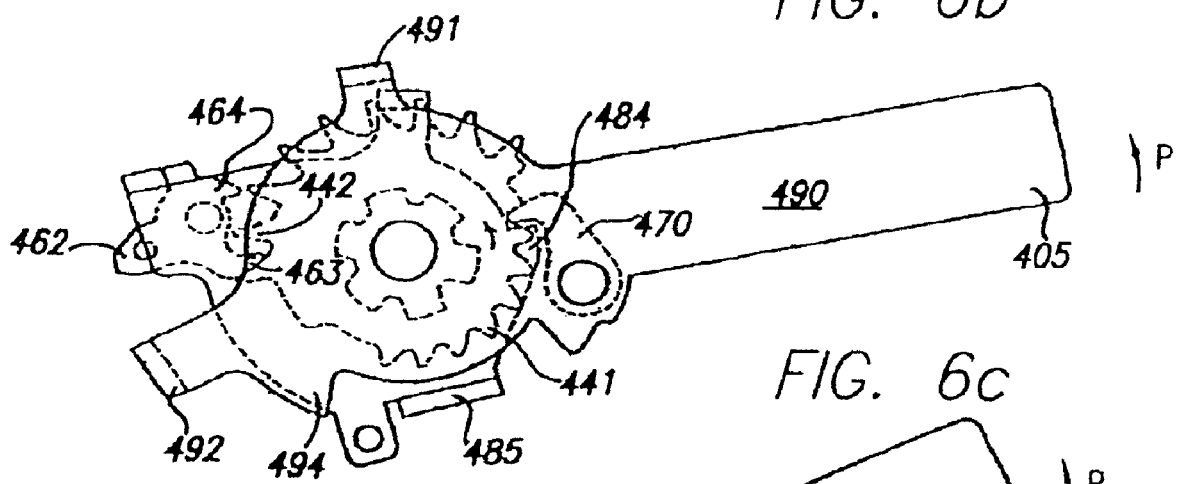

FIG. 6a depicts the positioning mechanism 400 of the present invention in a neutral position. To push the piston rod 322, the operating plate 490 is rotated in a counterclockwise or push direction. As best shown in FIG. 6b, the rotation of the operating plate 490, causes the push pawl 470 to slide off of the fixed plate ramp 484. Because the push pawl 470 is biased toward the latch plate 440, the push pawl engages one of the teeth of the pushing latch 441. When the push pawl 470 has engaged one of the teeth of the pushing latch 441, rotation of the operating plate 490 translates to a rotation of the latch plate 440.

Figure 6C:
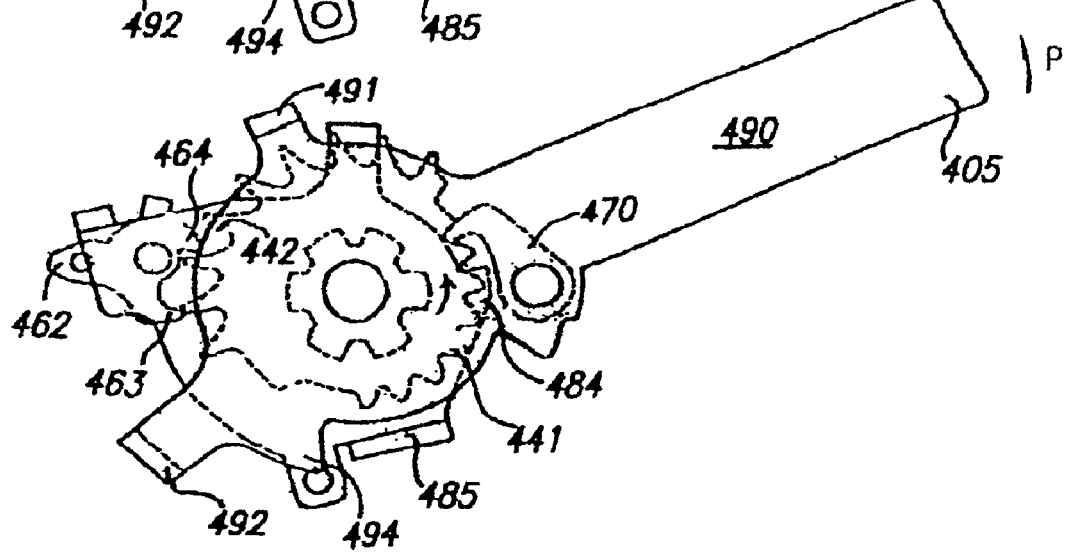

As best shown in FIG. 6c, the rotation of the latch plate 440 driven by the push pawl 470 causes the first claw 463 of the return pawl 460 to disengage from the positioning latch teeth 442. As the latch plate 440 is further rotated, the return pawl 460 moves toward a tooth of the positioning latch teeth adjacent the previously engaged tooth. Because the latch plate 440 is fixedly attached to the pinion gear 420, the pinion gear 420 rotates simultaneously with the latch plate 440 in the counterclockwise direction. The rotation of the pinion gear 420 drives the rack gear 450 causing the piston rod 322 to further extend into the main chamber 311, thus displacing the fluid in the master cylinder assembly 300.

As best shown in FIG. 6d, because the return pawl 460 is biased toward the latch plate 440, the return pawl engages a tooth of the positioning latch teeth 442 adjacent the previously engaged tooth. In a preferred embodiment of the invention, an audible click is produced when the first claw 463 of the return pawl 460 engages the positioning latch teeth 442. Moreover, the rider can feel the snap of the first claw 463 engaging the positioning latch teeth 442. The audible click and the snapping motion alerts the rider that the first claw 463 of the return pawl 460 has advanced by one tooth completing one step of a multi-step shift mechanism. Upon completion of the one step shift, the operating plate 490 returns to the neutral position, as shown in FIG. 6e.

In a preferred embodiment of the invention, the positioning mechanism 400 of the present invention is configured to enable the rider to shift more than one step at a time, and more preferably to shift up to three steps at a time. To perform a multi-step winding operation, the bicycle rider rotates the lever 405 further in the push direction P. The positioning mechanism 400 operates as described above in that the push pawl 470 engages the pushing latch 441 driving the pushing latch in the push direction P. The return pawl 460 disengages from the positioning latch teeth 442 and engages the tooth adjacent the previously engaged tooth. However, in the multi-step operation, the bicycle rider continues to rotate the lever 405 causing the latch plate 440 to rotate further, and the return pawl 460 to continue to engage neighboring teeth 442 until the latch plate 440 ceases to rotate. In a preferred embodiment of the invention, the angle of rotation of the operating lever 405 in the push direction P is limited by the contact of abutment 494 on the operating plate 490 and protrusion 485 on the fixed plate 480.

FIGS. 7a through 7d depict the operation of the positioning mechanism 400 in the return or downshift direction. To operate the positioning mechanism 400 in the return direction R, the lever 405 is rotated in the return or clockwise direction. As previously discussed, in a preferred embodiment of the invention, the release direction R is defined as the direction of movement of the lever 405 from the neutral position away from the handlebar. Elements that do not related to the downshift operation are eliminated from the figures for ease of understanding.

Figure 7A:
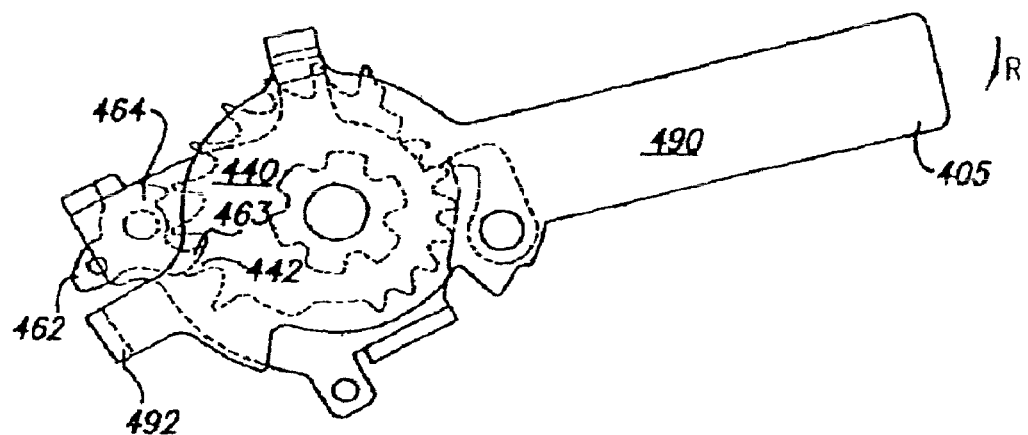
FIGS. 7a-7d are top cross-sectional views of the positioning mechanism of the present invention in operation in a downshift direction.
Figure 7B:
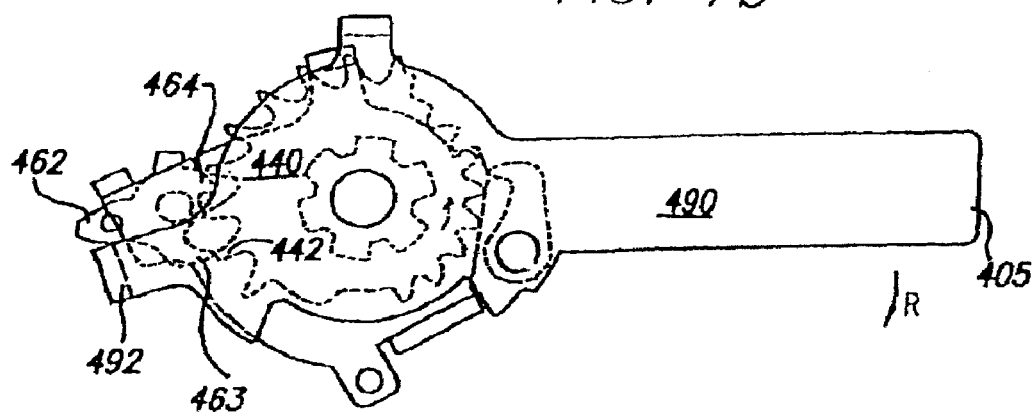
Figure 7C:
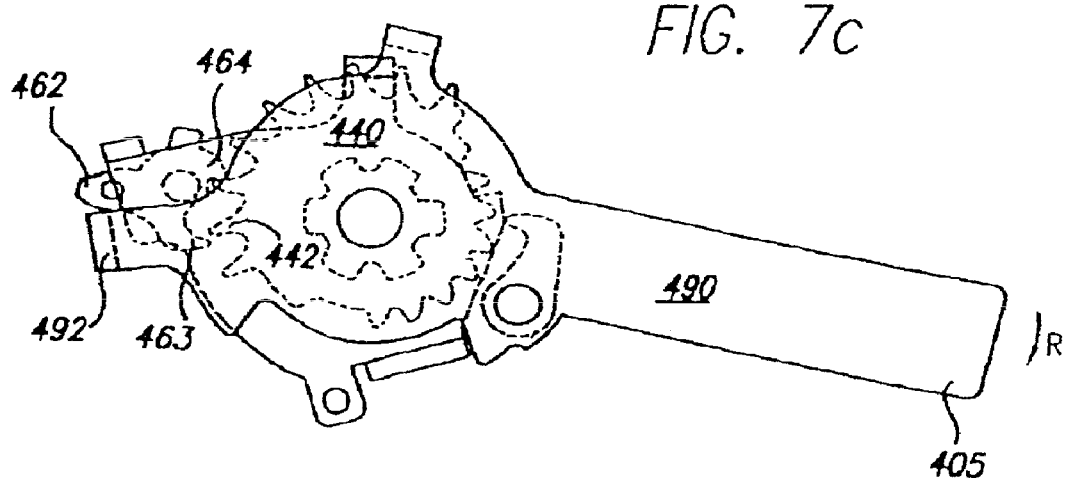
Figure 7D:
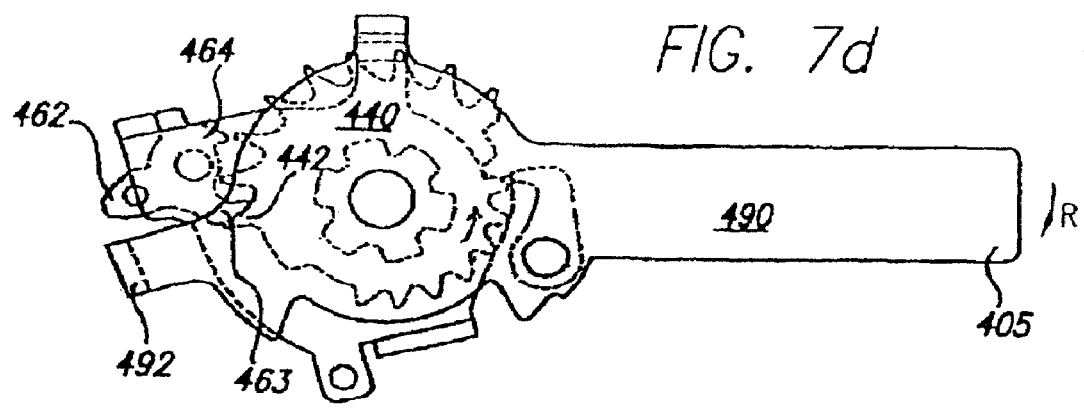

FIG. 7a depicts the positioning mechanism 400 of the present invention in a neutral position. Because the fluid in the fluid conduit 500 and the master piston 320 are biased by spring S1 and by the return spring of the derailleur 600 in the clockwise direction, the downshift operation can be performed by simply removing the force pushing on the master piston rod 322. As best shown in FIG. 7b, the rotation of the operating plate 490 causes abutment 492 on the operating plate 490 to contact abutment 462 on the return pawl 460. Abutment 462 is configured such that contact with abutment 492 causes the first claw 463 of the return pawl 460 to disengage from the positioning latch 442. As the first claw 463 disengages from the positioning latch 442, the second claw 464 engages the positioning latch 442 to limit the rotation of the latch plate 440 to one step, as shown in FIG. 7c. In a preferred embodiment of the invention, return pawl 460 produces an audible click when the second claw 464 engages the positioning latch 442. Moreover, the bicycle rider can feel the snap of the second claw 464 engaging the positioning latch 442. The audible click and the snapping motion alerts the rider that the return pawl 460 has advanced by one tooth. The rider can then return the operating lever to its neutral position, completing one step of a multi-step shift mechanism.

The drawings depict a positioning mechanism for a nine step shift operation. However, the present invention is not limited to a nine step shift operation and can be configured to vary the number of steps available. Furthermore, the description of the positioning mechanism and the corresponding drawings are directed to a positioning mechanism to be installed on the right hand side of a bicycle handlebar when viewed from the rider's perspective. The positioning mechanism installed on the left hand side of the bicycle handlebar is substantially the mirror image of the positioning mechanism of the right hand side.

The embodiments described above are exemplary embodiments of a hydraulic gear shift mechanism. Those skilled in the art may now make numerous uses of, and departures from, the above-described embodiments without departing from the inventive concepts disclosed herein. Accordingly, the present invention is to be defined solely by the scope of the following claims.

What is claimed is:

1. A shift control device attachable to a handlebar of a bicycle for adjusting a slave piston of a slave cylinder assembly of a hydraulic gear shift mechanism, the shift control device comprising:
   a bracket attachable to the handlebar;
   a pivot shaft spaced apart from the handlebar and fixedly secured to the bracket;
   a member rotatable in a first direction and a second direction about the pivot shaft;
   a lever operatively connected with the member, wherein the lever is biased in a neutral position and movable in a first and second direction, wherein the neutral position is between the first and second directions, and wherein rotation of the member in the first direction moves the slave piston in a push direction and the rotation of the member in the second direction moves the slave piston in a return direction.

2. The shift control device of claim 1 further comprising a push mechanism configured to cooperate with and rotate the member in the first direction; a cooperate with and rotate the member in the first direction; a return mechanism configured to cooperate with and rotate the member in the second direction; a master cylinder assembly having a master piston operatively connected to the member; and an adjusting piston adjustably extending into the master cylinder assembly.

3. The shift control device of claim 2, wherein the master cylinder assembly comprises a master chamber and an adjuster chamber, the primary piston is disposed in the master chamber, and the adjuster piston is disposed in the adjuster chamber.

4. The shift control device of claim 2, wherein the push mechanism comprises a first latch segment and a push pawl biased toward the first latch segment and configured to cooperate with the first latch segment to rotate the member in a first direction, and wherein the return mechanism comprises a second latch segment and a return pawl, the return pawl having a first claw and a second claw which alternately engage the second latch segment when the member is rotating in the second direction.

5. The shift control device of claim 4 further comprising a pinion gear rotatable about the pivot shaft and operatively connected to the member wherein the pinion gear rotates with the member; and a rack gear engaged with the pinion gear and operatively connected to the master piston of the master cylinder assembly, wherein the rotation of the member in the first direction corresponds to a movement of the piston in a push direction and the rotation in the second direction corresponds to a movement of the piston in a return direction.

6. The shift control device of claim 2 wherein the master cylinder assembly comprises a main chamber for the master piston and an adjuster chamber for the adjusting piston, the master piston is adjustable to vary the depth of the master cylinder in the master chamber, the adjusting piston is adjustable to vary the depth of the adjusting piston in the adjuster chamber, and both the depth of the master piston in the master chamber and the depth of the adjusting piston in the adjuster chamber define a volume of hydraulic fluid in the master cylinder assembly.

7. The shift control device of claim 1 wherein the pivot shaft is substantially vertically oriented.

8. A shift control device attachable to a handlebar of a bicycle for adjusting a slave piston of a slave cylinder assembly of a hydraulic shift gear mechanism, the shift control device comprising:
   a bracket attachable to the handlebar;
   a pivot shaft spaced apart from the handlebar and fixedly secured to the bracket;
   a member rotatable in a first direction and a second direction about the pivot shaft;
   a lever operatively connected with the member,
   wherein the lever is biased in a neutral position and movable in a first and second direction, wherein the neutral position is between the first and second directions, and wherein when the lever is moved away from the neutral position in one selected from the first direction and the second direction and then subsequently released, the lever returns to the neutral position.

9. The shift control device of claim 8 further comprising a push mechanism configured to cooperate with and rotate the member in the first direction; a return mechanism configured to cooperate with and rotate the member in the second direction; a master cylinder assembly having a master piston operatively connected to the member; and an adjusting piston adjustably extending into the master cylinder assembly.

10. The shift control device of claim 9, wherein the master cylinder assembly comprises a master chamber and an adjuster chamber, the primary piston is disposed in the master chamber, and the adjuster piston is disposed in the adjuster chamber.

11. The shift control device of claim 9, wherein the push mechanism comprises a first latch segment and a push pawl biased toward the first latch segment and configured to cooperate with the first latch segment to rotate the member in a first direction, and wherein the return mechanism comprises a second latch segment and a return pawl, the return pawl having a first claw and a second claw which alternately engage the second latch segment when the member is rotating in the second direction.

12. The shift control device of claim 11 further comprising a pinion gear rotatable about the pivot shaft and operatively connected to the member wherein the pinion gear rotates with the member; and a rack gear engaged with the pinion gear and operatively connected to the master piston of the master cylinder assembly, wherein the rotation of the member in the first direction corresponds to a movement of the piston in a push direction and the rotation in the second direction corresponds to a movement of the piston in a return direction.

13. The shift control device of claim 9 wherein the master cylinder assembly comprises a main chamber for the master piston and an adjuster chamber for the adjusting piston, the master piston is adjustable to vary the depth of the master cylinder in the master chamber, the adjusting piston is adjustable to vary the depth of the adjusting piston in the adjuster chamber, and both the depth of the master piston in the master chamber and the depth of the adjusting piston in the adjuster chamber define a volume of hydraulic fluid in the master cylinder assembly.

* * * * *